United States Patent
Havens et al.

(10) Patent No.: US 7,589,331 B2
(45) Date of Patent: Sep. 15, 2009

(54) UV-C SENSITIVE COMPOSITION AND DOSIMETER

(75) Inventors: Marvin Russell Havens, Greer, SC (US); Drew Ve Speer, Simpsonville, SC (US); David Ray Kyle, Moore, SC (US)

(73) Assignee: Cryovac, Inc., Duncan, SC (US)

( * ) Notice: Subject to any disclaimer, the term of this patent is extended or adjusted under 35 U.S.C. 154(b) by 168 days.

(21) Appl. No.: 11/803,303

(22) Filed: May 14, 2007

(65) Prior Publication Data

US 2007/0210264 A1    Sep. 13, 2007

Related U.S. Application Data

(62) Division of application No. 11/159,372, filed on Jun. 22, 2005, now abandoned.

(51) Int. Cl.
    *G01J 1/38* (2006.01)
(52) U.S. Cl. .................................. 250/474.1
(58) Field of Classification Search ............. 250/472.1, 250/473.1, 474.1, 482.1
    See application file for complete search history.

(56) References Cited

U.S. PATENT DOCUMENTS

| | | | |
|---|---|---|---|
| 3,787,687 A * | 1/1974 | Trumble ................... | 250/474.1 |
| 4,003,707 A | 1/1977 | Lübbers et al. | |
| 4,080,491 A | 3/1978 | Kobayashi et al. | |
| 4,130,760 A * | 12/1978 | Fanselow et al. ......... | 250/474.1 |
| 4,308,459 A * | 12/1981 | Williams .................. | 250/474.1 |
| 4,476,870 A | 10/1984 | Peterson et al. | |
| 4,882,598 A * | 11/1989 | Wulf ........................ | 250/338.1 |
| 5,008,548 A * | 4/1991 | Gat ............................ | 250/372 |
| 5,028,792 A | 7/1991 | Mullis | |
| 5,117,116 A | 5/1992 | Bannard et al. | |
| 5,135,832 A | 8/1992 | Sacripante et al. | |
| 5,206,118 A | 4/1993 | Sidney et al. | |
| 5,211,875 A | 5/1993 | Speer et al. | |
| 5,296,275 A * | 3/1994 | Goman et al. ............. | 428/29 |
| 5,365,068 A * | 11/1994 | Dickerson ................. | 250/372 |
| 5,378,896 A | 1/1995 | Knjaschewitsch et al. | |
| 5,411,835 A | 5/1995 | Brinser | |
| 5,436,115 A | 7/1995 | Mullis | |
| 5,565,296 A | 10/1996 | Kmiecik-Lawrynowicz et al. | |
| 5,612,541 A | 3/1997 | Hoffmann et al. | |
| 5,696,381 A | 12/1997 | Quintern | |
| 5,880,063 A * | 3/1999 | Hoffman et al. ............ | 503/201 |
| 5,904,960 A | 5/1999 | Becraft et al. | |

(Continued)

*Primary Examiner*—David P Porta
*Assistant Examiner*—David S Baker
(74) *Attorney, Agent, or Firm*—Alston & Bird LLP

(57) ABSTRACT

The invention is a UV sensitive composition that undergoes a color change upon exposure to a predetermined dosage of UV-C radiation. The UV-C sensitive composition comprises a halogenated polymer, such as polyvinylidene chloride, that produces an acid upon exposure to UV radiation, and a pH sensitive dye. Upon exposure to UV-C radiation, the halogenated polymer undergoes degradation and produces HCl. The pH sensitive dye changes color as a result in an increase in HCl in the system. The composition may also include an acid scavenging composition and/or a diluent to control the amount of HCl produced in the system. The amount of HCl liberated from UV-C exposure may be selectively controlled so that a color change may be produced at a desired UV-C dosage. In some embodiments, the composition may be used to indicate a UV-C dosage from about 100 to 1600 mJ/cm².

16 Claims, 6 Drawing Sheets
(3 of 6 Drawing Sheet(s) Filed in Color)

U.S. PATENT DOCUMENTS

| | | |
|---|---|---|
| 5,910,562 A | 6/1999 | Miura et al. |
| 5,911,910 A | 6/1999 | Becraft et al. |
| 6,060,321 A * | 5/2000 | Hovorka .................... 436/57 |
| 6,233,907 B1 | 5/2001 | Cook, Jr. et al. |
| 6,254,969 B1 | 7/2001 | Eberle |
| 6,287,481 B1 | 9/2001 | Luthra et al. |
| D458,642 S * | 6/2002 | Jackson .................... D20/22 |
| 6,433,035 B1 | 8/2002 | Grinevich et al. |
| 6,437,346 B1 * | 8/2002 | Goudjil ................... 250/474.1 |
| 6,475,433 B2 * | 11/2002 | McGeorge et al. ............ 422/24 |
| 6,504,161 B1 * | 1/2003 | Jackson et al. ........... 250/474.1 |
| 6,689,438 B2 | 2/2004 | Kennedy et al. |
| 6,734,440 B2 | 5/2004 | Questel et al. |
| 6,806,022 B1 | 10/2004 | Kawabe et al. |
| 7,476,874 B2 * | 1/2009 | Patel ....................... 250/484.5 |
| 2001/0019110 A1 * | 9/2001 | Faran et al. .............. 250/474.1 |

* cited by examiner

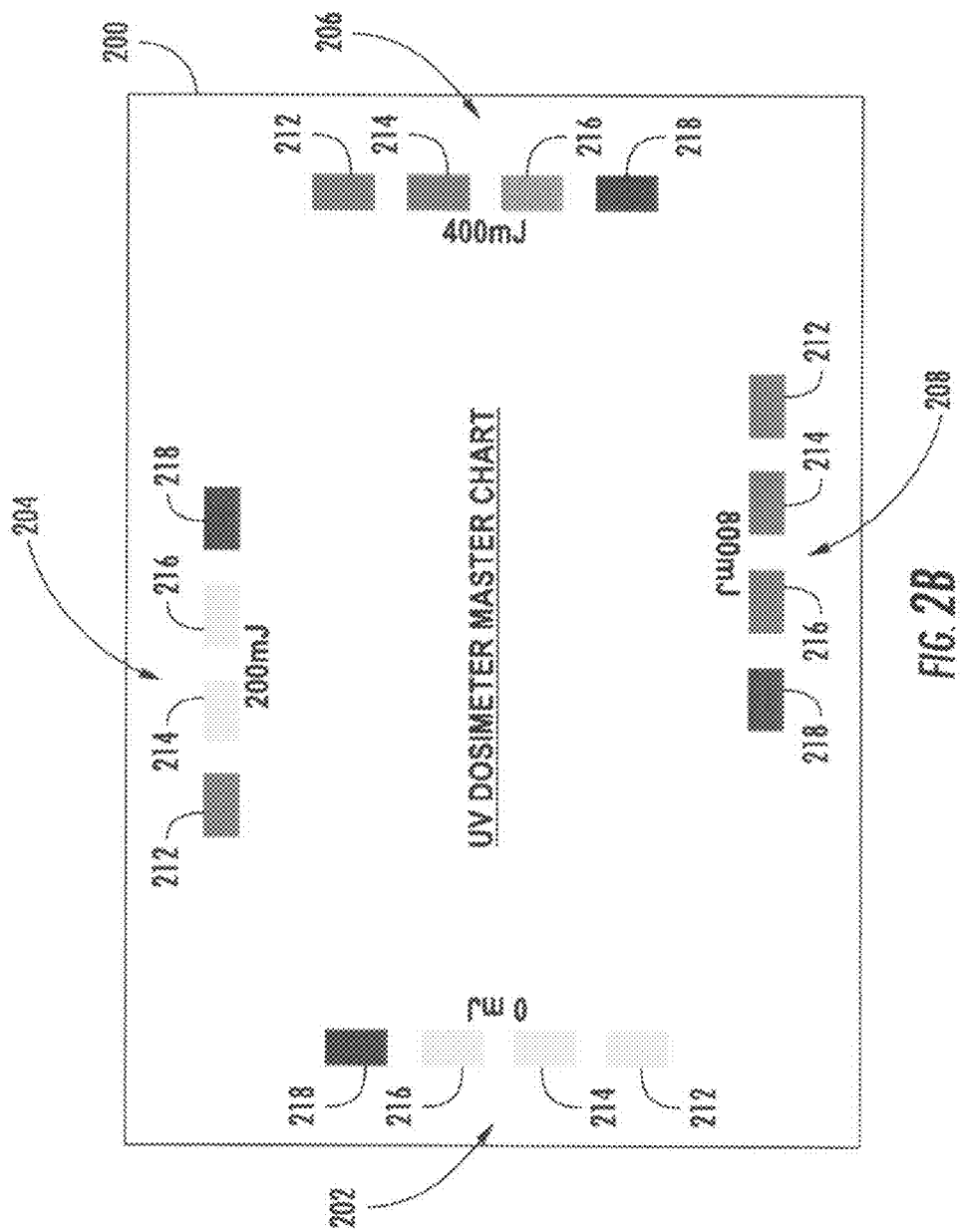

UV-C SENSITIVE COMPOSITION AND DOSIMETER

CROSS REFERENCE TO RELATED APPLICATIONS

This application is a divisional of U.S. application Ser. No. 11/159,372, filed Jun. 22, 2005, now abandoned incorporated herein by reference in its entirety, and claims the benefit of its earlier filing date under 35 U.S.C. 119(e).

BACKGROUND OF THE INVENTION

The invention relates generally to a UV sensitive composition, and dosimeters for measuring UV radiation, and more particularly to dosimeters that are adapted to measure UV-C radiation.

It is generally known that reducing the exposure to oxygen of oxygen sensitive articles maintains and enhances the quality and shelf life of the article. For instance, reducing the oxygen exposure of oxygen sensitive food products in a packaging system maintains the quality of the food product and avoids food spoilage. Reduced oxygen exposure keeps the product in inventory longer, thereby reducing costs incurred from waste and having to restock.

One method of reducing oxygen exposure is to incorporate an oxygen scavenging composition into the packaging structure, such as in a film or tray. Oxygen scavenging compositions are compositions that consume, deplete, or reduce the amount of oxygen in a given environment. There are a wide variety of different compositions that can be used in oxygen scavenging applications. Exemplary compositions are described in U.S. Pat. Nos. 5,211,875; 5,350,622; 5,399,289; and 5,811,027 to Speer et al. and WO 99/48963 to Cai et al. The oxygen scavenging compositions can be "triggered" by exposing the composition to a radiation source, such as actinic radiation, having sufficient power for a sufficient amount of time to initiate oxygen scavenging.

Methods of triggering oxygen scavenging compositions typically use low-pressure mercury germicidal lamps that have an intensity output from about 5 to 10 mW/cm$^2$. These lamps are commonly referred to as germicidal since the principal emission is at 254 nm. A dosage of UV-C light of about 100 to 1600 mJ/cm$^2$ is typically needed to trigger oxygen scavenging. For details on preferred methods for activating such oxygen scavenging compositions at point of use, see Speer et al., U.S. Pat. No. 5,211,875, Becraft et al., U.S. Pat. Nos. 5,911,910, and 5,904,960, and co-pending applications U.S. Ser. No. 09/230,594 filed Aug. 1, 1997, and Ser. No. 09/230,776 filed Jul. 29, 1997, and U.S. Pat. No. 6,233,907 (Cook et al.), all of which are incorporated herein by reference in their entirety.

Unfortunately, oxygen scavengers do not always activate on command. This may result from a number of factors, including defective scavenger compositions, inadequate triggering conditions, operator error, or a combination of these or other factors. In many instances, it may not be readily apparent whether the oxygen scavenging composition is defective or whether the failure originated in the triggering equipment. Typically, conventional oxygen scavengers do not themselves visually indicate whether or not they are active. In response to this uncertainty, operators of packaging assembly plants prefer to verify scavenger activity as soon as possible after triggering. The longer a failed triggering attempt remains undiscovered, the more waste and expense is incurred, especially where packaging equipment operates at high speeds.

There are several methods for verifying oxygen scavenger activity. Typically, oxygen concentrations are measured in the package after it has been assembled. This can typically be accomplished by using a probe that measures the oxygen concentration in the package, or with an oxygen indicator that is disposed in the interior of the package, or in the packaging material itself. U.S. Pat. No. 6,689,438 to Kennedy et al. describes a luminescent compound that can be incorporated into a film or article. The luminescent compound is adapted to detect and measure oxygen concentration levels in the packaging.

If the oxygen scavenging activity is too low it will be necessary to determine whether the problem is associated with the compound or the triggering equipment. Typically, this requires the operator to stop production and review the current status and operation of the triggering equipment. In many cases, an operator may waste time in verifying that the triggering unit is functioning when the problem is with the compound itself. To quickly eliminate the triggering equipment as a source of the problem, it has been proposed to incorporate fiber optic monitors into the trigger equipment. The fiber optic monitors would measure the output of the lamps. The monitors could then be checked to verify that the triggering equipment is working properly. Unfortunately, fiber optic monitors are typically cost prohibitive and may require retrofitting the existing UV triggering equipment. In some instances, it may not be feasible to use the fiber optic monitors with the existing equipment.

Thus, there remains a need in the art for a significantly faster method and article for verifying that oxygen scavenging compositions have been exposed to a sufficient dosage of UV-C radiation.

BRIEF SUMMARY OF THE INVENTION

In one embodiment, the invention comprises a UV sensitive composition that undergoes a color change upon exposure to a predetermined dosage of UV-C radiation. The UV-C sensitive composition comprises a halogenated polymer, such as polyvinylidene chloride, that produces an acid upon exposure to UV radiation, and a pH sensitive dye. Upon exposure to UV-C radiation, the halogenated polymer undergoes degradation and produces HCl. The pH sensitive dye changes color as a result of increased levels of HCl in the system. The composition may also include an acid scavenging composition and/or a diluent to control the amount of free HCl produced in the system. The amount of HCl liberated from UV-C exposure may be selectively controlled so that a color change may be produced at a desired UV-C dosage. In some embodiments, the composition may be used to indicate a UV-C dosage from about 100 to 1600 mJ/cm$^2$.

The UV-C sensitive composition may comprise a non-aqueous lacquer based system in which the components of the composition are miscible in a suitable lacquer solvent. The lacquer based system allows the composition to be applied to the surface of a substrate without the need for further polymerization or cross-linking.

In a second embodiment, the invention comprises a dosimeter having one or more UV-C compositions deposited thereon and wherein each composition is selectively formulated to be sensitive to a predetermined dosage of UV-C radiation. In some embodiments, the UV-C dosimeter comprises a first composition that undergoes a color change in response to a UV-C dosage of about 200 mJ/cm$^2$ or greater; a second composition that undergoes a color change in response to a UV-C dosage of about 400 mJ/cm$^2$ or greater; and a third composition that undergoes a color change in response to a UV-C dosage of about 800 mJ/cm² or greater. In one alternative embodiment, the dosimeter may be in the form of a kit having a test card and an associated reference card. In this embodiment, the test card comprise a substrate having one or more UV-C sensitive compositions that are formulated to undergo a color change in response to a predetermined dosage of UV-C radiation, e.g., 200, 400, 800 mJ/cm² or greater, that are deposited on the substrate. The reference card may include one or more reference colors that are each associated with a different dosage of UV-C radiation, and wherein the reference card includes a corresponding reference color for each UV-C sensitive composition on said substrate. A user compares the test card to the reference card to determine the dosage of UV-C radiation to which the test card may have been exposed.

Thus, the invention provides a composition and article for efficiently determining the UV-C dosage to which an item may have been exposed.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Having thus described the invention in general terms, reference will now be made to the accompanying drawings, which are not necessarily drawn to scale, and wherein:

FIG. 2B is a color illustration of the reference card of FIG. 2A;

DETAILED DESCRIPTION OF THE INVENTION

Figure 1A:
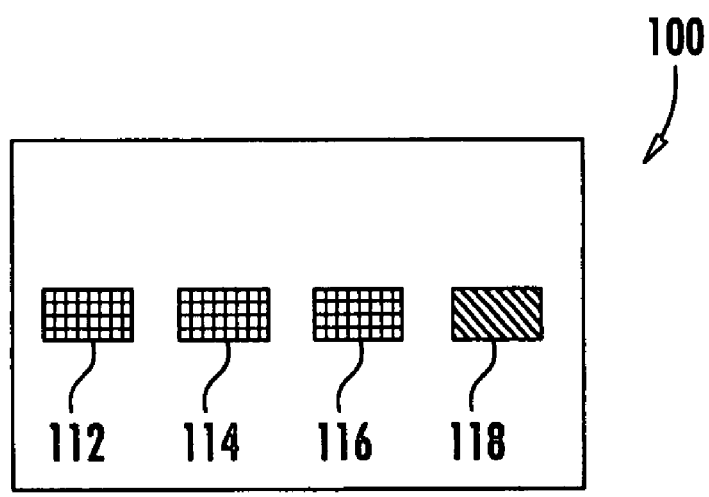
FIG. 1A is a graphical illustration of a test card having a plurality of UV-C sensitive films coated thereon.

The invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The UV sensitive composition of the present invention in one embodiment comprises a non-aqueous lacquer based mixture of a halogenated polymer that produces an acid upon exposure to UV radiation, such as polyvinylidene chloride, and at least one dye that is sensitive to changes in pH. The halogenated polymer is capable of producing an acidic product upon exposure to ultraviolet radiation. The pH sensitive dye is capable of producing a change in color in response to a change in the concentration of the acidic product. As a result, the UV sensitive composition may undergo a color change within a predetermined color range in response to exposure to ultraviolet radiation. In some embodiments, the UV sensitive composition may also include one or more acid scavengers and one or more diluents.

In some embodiments, the UV sensitive composition may undergo several changes in response to increasing dosage or alternatively, may undergo a single color change after exposure to a predetermined dosage. For example, a first color change may represent a relatively low concentration of the acidic product while a second color change represents a relatively high concentration of the acidic product. The first color and the second color may represent the endpoints of the color range or one or both of the first color and the second color may represent intermediate colors within the range. The color range may include different colors, different hues of one or more colors or a combination of different colors and different hues. The first color and the second color may be selected so as to represent a desired or predetermined amount of UV-C dosage.

In some embodiments, the UV-sensitive composition may comprise a solvent based lacquer. In general, lacquers may comprise a non-aqueous solution that may be used to form a film. In some embodiments, the lacquer may comprise a hydrophobic system. The components of the UV sensitive composition may be soluble in non-aqueous solutions and are therefore capable of forming a solution comprising a substantially continuous non-aqueous phase. The lacquer-based solution typically includes the halogenated polymer, pH sensitive dye, and a non-aqueous solvent that may act as a carrier for the above and any additional ingredients. In some embodiments, the lacquer-based UV-sensitive composition is applied to a substrate in the form of a solution. In some embodiments, the lacquer may have a viscosity that allows the lacquer to be applied to a substrate so that running or smearing may be reduced. Evaporation of the solvent results in the UV-sensitive composition forming a film on the surface of the substrate, without requiring any additional cross-linking or polymerization.

In some embodiments, the UV sensitive composition may include a resin that may be dissolved or dispersed in a non-aqueous solution. The UV sensitive composition is typically produced by dissolving or dispersing the halogenated polymer, pH sensitive dye, and any additional components such as an acid scavenger and diluent in a non-aqueous solvent. In some embodiments, the solvent system may comprise a hydrophobic solvent. Suitable solvents for use in the invention should be able to dissolve each of the components into solution. Suitable solvents may include toluene, ethyl acetate, tetrahydrofuran, and combinations thereof. In one embodiment, the UV sensitive solution comprises from about 15 to 30 percent solid content, such as a solid content of about 20 percent. The dissolved UV sensitive composition may then be applied to a substrate, after which the solvent is evaporated to produce a film comprising the UV sensitive composition. Typically, a solution having about 20 percent solids laid down 5 mils thick may result in a dry coating that is about 1 mil thick.

Halogenated polymers that may be useful in the invention include polymers comprising halogenated monomers and copolymers that undergo degradation in response to UV exposure. Typically, the halogenated polymers of the invention undergo radiation induced degradation when exposed to radiation at wavelengths below about 400 nm. In some embodiments, the halogenated polymers are particularly sensitive to UV-C radiation having wavelengths from about 200 to 280 nm. UV degradation of the polymer typically results in the release of at least one halogen component and an associated hydronium ion. As a result, UV induced degradation produces HCl and thereby lowers the pH of the composition. Continued UV exposure results in further degradation of the polymer, and hence, a further decrease in the pH of the composition. Suitable halogenated polymers include, without limitation, polyvinyl chloride (PVC), polyvinylidene chloride (PVDC), ethylene-chlorotrifluoroethylene copolymer, chlorinated rubber, and copolymers thereof. In some embodiments, the halogenated copolymers may also be combined with one or more monomers that have little or no halogen content. As a result, the UV sensitivity of the composition may be controlled or attenuated by selecting polymers having a desired halogen content. In one alternative embodiment, the composition may include from 0.1 to 50 wt. percent halogenated polymer, based on the weight of the solid content.

At first glance, it would not seem practical to use a halogenated polymer as a component in measuring UV-C dosage because these polymers typically undergo non-linear degradation that can be difficult to predict. This is especially true in situations where it is desirable to measure UV-C dosages that exceed 100 mJ/cm$^2$. UV degradation of halogenated polymers such as PVC and PVDC produce a degradation process that becomes auto-excited and self-propagating. As a result, the extinction coefficient of the reaction increases and shifts to longer wavelengths resulting in even further degradation. This effect is heightened as the UV dose is increased. The production of the halogenated acid product, such as HCl, also further increases degradation of the polymer. However, it has been discovered, that such halogenated polymers can be used in determining UV-C dosages that exceed 100 mJ/cm$^2$ by balancing the amount of halogenated polymer with the buffering capacity of the system including the pH sensitive dye.

In one alternative embodiment, the pH sensitive dye may have some initial buffering capacity. The buffering capacity of the pH sensitive dye may be used to initially control the pH of the composition. A formulation comprising the halogenated polymer and the pH sensitive dye may be used to prepare a UV sensitive composition that undergoes a color change at relatively low doses of UV-C radiation. Such low doses are typically up to about 200 mJ/cm$^2$, with a dosage up to about 100 mJ/cm$^2$ being somewhat more typical. By "pH sensitive dye" is meant one or more compounds which change color dependent upon pH, preferably with sharp color changes over a narrow pH range, and which are soluble in a non-aqueous solution. Examples include bromophenol blue, phenol red, thymol blue, ethyl orange, m-Cresol purple, New Fuchsin, p-methyl red, lissamine green, aniline blue, methyl violet, crystal violet, ethyl violet, brilliant green, oralochite green oxalate, methyl green, cresol red, quinaldine red, para methyl red, bromothymol blue, metanil yellow, orange IV, phenylazoaniline, erythrosin B, benzopurpurin 4B, congo red, methyl orange, resazurin, methyl red, alizarin red, bromocresol purple, chlorophenol red, or combinations of dyes for multiple color changes. Such dyes may be provided in an amount between 0.5 to 25 percent by weight, based on the total weight of the solids in the composition. The pH sensitive dyes that may be useful in the invention may generally be soluble in the lacquer based solvent systems.

It has been discovered that the ability of the UV sensitive composition of the invention to measure higher doses of UV-C radiation can be increased by including one or more acid scavengers and/or one or more diluents. The acid scavenger helps reduce or lessen the amount of free acid that is present in the UV sensitive composition. As a result, the amount of UV dosage that is required to produce a color change in the composition can be controlled by increasing or decreasing the amount of the acid scavenger that is present in the composition. As used herein, the term "acid scavenger" refers generally to any composition that has the ability to neutralize acidic species in the UV sensitive composition that are present as a result of UV induced degradation of the halogenated polymer. In some embodiments, the acid scavenger is soluble in non-aqueous solutions with the halogenated polymer and the pH sensitive dye. Suitable acid scavenging components include, but are not limited to, 1,4-diazabicyclo[2.2.2]octane; 2,6-di-tert-butylpyridine; dibutyl 2,6-pyridinedicarboxylate; diphenylamine; 2,4-dihydroxybenzophenone; [5.4.0]undec-7-ene (1,5-5); 1,5-diazabicyclo[4.3.0]non-5-ene; 4-(dimethylamino)pyridine; hexamethylenetetramine; and combinations thereof. When present, the amount of acid scavenger in the UV sensitive composition may be from about 0.5 to 20 percent by weight, based on the total weight of the solids of the coating composition. In some embodiments, the acid scavenger may have a pKa from about 8 to 4.

The UV sensitive composition may also include, in another embodiment, a diluent that helps attenuate the UV sensitivity of the composition. In this embodiment, the addition of a diluent decreases the amount of halogenated polymeric resin that is present in the UV sensitive composition, while maintaining the desired solid content of the composition. As a result, the amount of acid that is produced during UV exposure can be controlled by increasing or decreasing the content of the halogenated polymer. The diluent typically comprises a non-halogenated resin that allows the amount of the halogenated polymer to be increased or decreased while maintaining the desired solid content of the resin component. Suitable diluents should also be soluble in non-aqueous solutions with the halogenated polymer and the pH sensitive dye. Useful diluents may include cellulose acetate propionate (CAP), starch, hydroxyethyl cellulose, methyl cellulose, carboxymethyl cellulose, gelatin, casein, gum arabic, styrene-maleic anhydride copolymers, ethylene-acrylate copolymers, styrene-butadiene copolymers, acrylonitrilebutadiene copolymers, poly(ethylene vinyl acetate), and combinations thereof. When present, the amount of diluent generally used is about 1 percent to about 50 percent by weight, and preferably about 5 percent to about 25 percent by weight, based on the total weight of the solids of the coating composition.

The proportions of each component in the UV sensitive composition are selected to provide a desired color change upon exposure to a predetermined dosage of UV-C radiation. It should be recognized that the UV dosage that produces a color change is dependent upon the particular formulation and may be varied depending upon its desired application.

In some embodiments, the UV sensitive composition may also include a screen layer that prevents the UV sensitive composition from being exposed to radiation longer than about 300 nm, such as longer than 280 nm. The screen layer may comprise a screening agent that is coated over the UV sensitive composition layer. Substances may be used as a screening agent provided they do not interfere with transmission of UV-C radiation to the UV sensitive composition. This can include screening agents known to selectively screen UV-A radiation and visible radiation such as Parsol.TM. (4-(1,1-Dimethylethyl)-4'-methoxydibenzoylmethane) or related agents such as phorone, menthyl anthranilate, 2-hydroxy-4-methoxybenzophenone, 2,2-dihydroxy-4-methoxybenzophenone, or 2-amino-benzophenone.

Figure 1B:
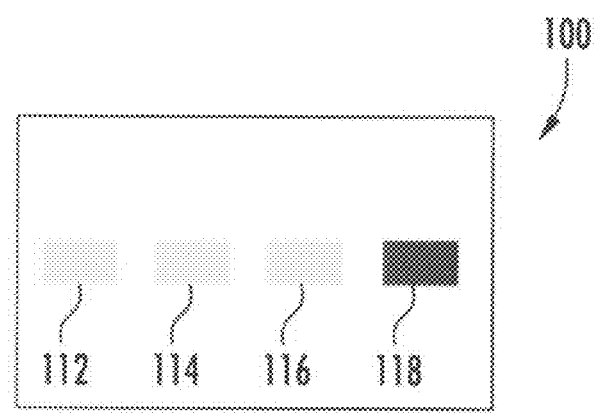
FIG. 1B is a color illustration of the test card of FIG. 1A.

With reference to FIGS. 1A and 1B, an exemplary UV-C dosimeter is illustrated and broadly designated as reference number 100. In the embodiment illustrated in FIG. 1, the UV-C dosimeter comprises a test card 100 having a plurality of UV sensitive compositions in the form of a film deposited thereon. Each composition is selectively formulated to change color at a predetermined dosage of UV-C radiation. In some embodiments, each UV sensitive composition comprises a discrete region or portion of the test card. In some embodiments, the color change may be dramatic so that it will be easily recognizable by an operator. Here, for example, each successive film from left to right may change color in response to increasing dosage of UV-C radiation.

In this illustration, the first film 112, from left to right, may represent the most sensitive composition. Exposure to a UV-C dosage greater than about 200 mJ/cm$^2$ may cause the first film 112 to change color. In some embodiments, each UV sensitive film, such as films 114, 116, may be capable of going through several color changes as the UV-C dosage to which the film has been exposed increases. The second film 114 may be formulated to change color at an exposure greater than about 200 mJ/cm$^2$. The third film 116 may comprise a UV-sensitive composition that may be formulated to undergo a color change after exposure to a UV dosage of about 400 mJ/cm$^2$ or greater. The fourth film 118 may comprise a composition that may be formulated to undergo a color change at dosages exceeding about 800 mJ/cm$^2$ or greater.

As can best be seen in FIG. 1B, films 112, 114, 116 may initially be formulated to have a yellow color before any exposure to UV-C radiation occurs. Subsequent exposure to increased dosages of UV-C radiation may cause each film to change from a yellow color to a final red color (see briefly FIG. 2B). The final red color may represent an exhaustion of the halogenated polymer or the pH sensitive dye. In some embodiments, film 118 may be formulated to have a composition that only undergoes a change at higher dosages of UV-C radiation, e.g., 800 to 1600 mJ/cm$^2$.

It should be recognized that the arrangement and desired color change can be varied depending upon preference. It should be also recognized that the number of UV-C sensitive compositions deposited on the UV-C dosimeter and their respective UV-C color change thresholds can be varied to accommodate varying uses and possible UV-C dosage exposures.

Figure 2A:
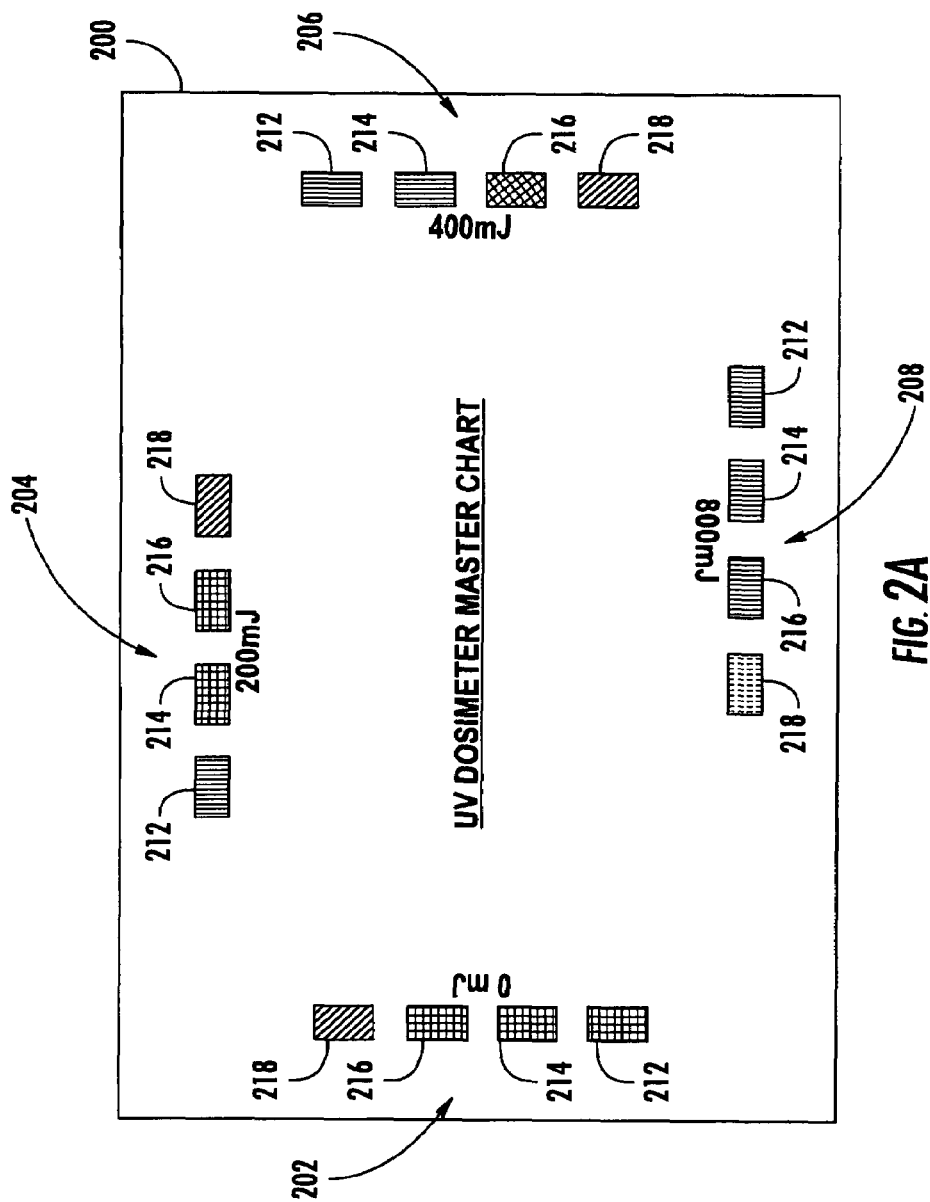
FIG. 2A is a graphical illustration of a reference card that may be used to determine the UV-C dosage to which the test cards of FIGS. 1A and 1B may have been exposed.

FIGS. 2A and 2B illustrate an exemplary UV dosage reference card 200 that may be adapted to be used in conjunction with UV dosimeter 100. The exemplary UV dosimeter reference card 200 may comprise four sides, each of which may have four different reference patterns printed thereon 202, 204, 206, 208. Each reference pattern may refer to a different UV-C dosage. Here, the reference card 200 includes a first reference pattern 202 of four discrete colors that may match the appearance of the UV dosimeter 100 before any UV-C exposure has occurred. For example, the first pattern 202 may be used to indicate a UV-C dosage of about 0 mJ/cm$^2$. As shown, the first reference pattern 202 may include a total of four color marks, wherein three of the color marks 212, 214, 216 may have the same color, such as yellow, and the fourth color mark 218 may be same color or have a different color, such as green. This first reference pattern 202 may be used to indicate that the test card 100 has not been exposed to UV-C radiation or has been exposed to a dosage of UV-C radiation that is insufficient to produce a color change.

The second reference pattern 204 may also include four discrete color marks that show the change in color that may occur as the test card 100 is exposed to increasing doses of UV-C radiation. For example, in this illustration, color mark 212 has changed from a yellow color (see reference pattern 202) to a red color. Color marks 214, 216, and 218 have not noticeably changed color to an observer. The change in color of color mark 212 may be used to indicate that the test card has been exposed to a threshold dosage of UV-C radiation, such as 200 mJ/cm$^2$.

Moving to reference pattern 206, it can be now be seen that both 212 and 214 are now a red color and color mark 216 has changed from a previous yellow color in reference patterns 202, 204 to an orange color. Color mark 218 has not noticeably changed color to an observer. Likewise, color mark 212 may not have changed color because the corresponding film on the test card (see FIG. 1, reference number 112) may comprise a more sensitive formulation that has previously been exhausted. The change in color of color marks 214 and 216 may be used to indicate that the test card has been exposed to a threshold dosage of UV-C radiation, such as 400 mJ/cm$^2$.

In reference pattern 208, color mark 218 may have changed to another color. In FIG. 2B this may be represented as change from a green color to a purple color. This change in color of color mark 218 may be used to indicate that the test card has been exposed to a threshold dosage of UV-C radiation, such as 800 mJ/cm$^2$. Also, reference patterns 202, 204, 206 in some embodiments may now have about the same color as each other, which may be an indication that the corresponding films on the test card may have exhausted the halogenated polymer.

It should be recognized, that the color patterns discussed above and the change in colors with respect to various dosages of UV-C radiation may be varied depending upon their intended application. It should also be recognized that the number of reference patterns, color marks, and formulations on the test card, respectively, may be varied to accommodate a broader or narrower range of UV-C dosages.

Figure 3A:
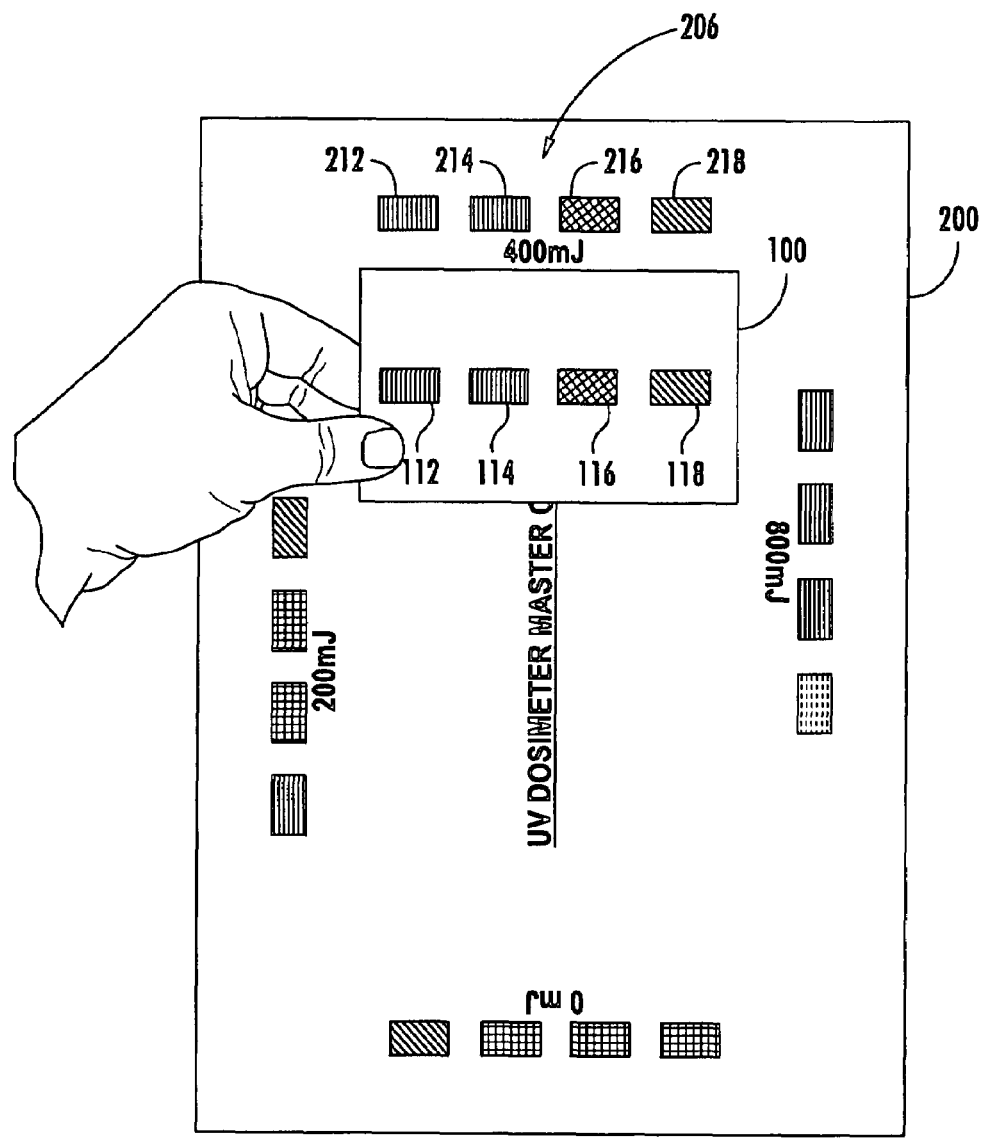
FIG. 3A is a graphical illustration of an operator using the test card of FIG. 1A or 1B in conjunction with the reference card of FIG. 2A or 2B to determine the UV-C dosage to which the test card may have been exposed.
Figure 3B:
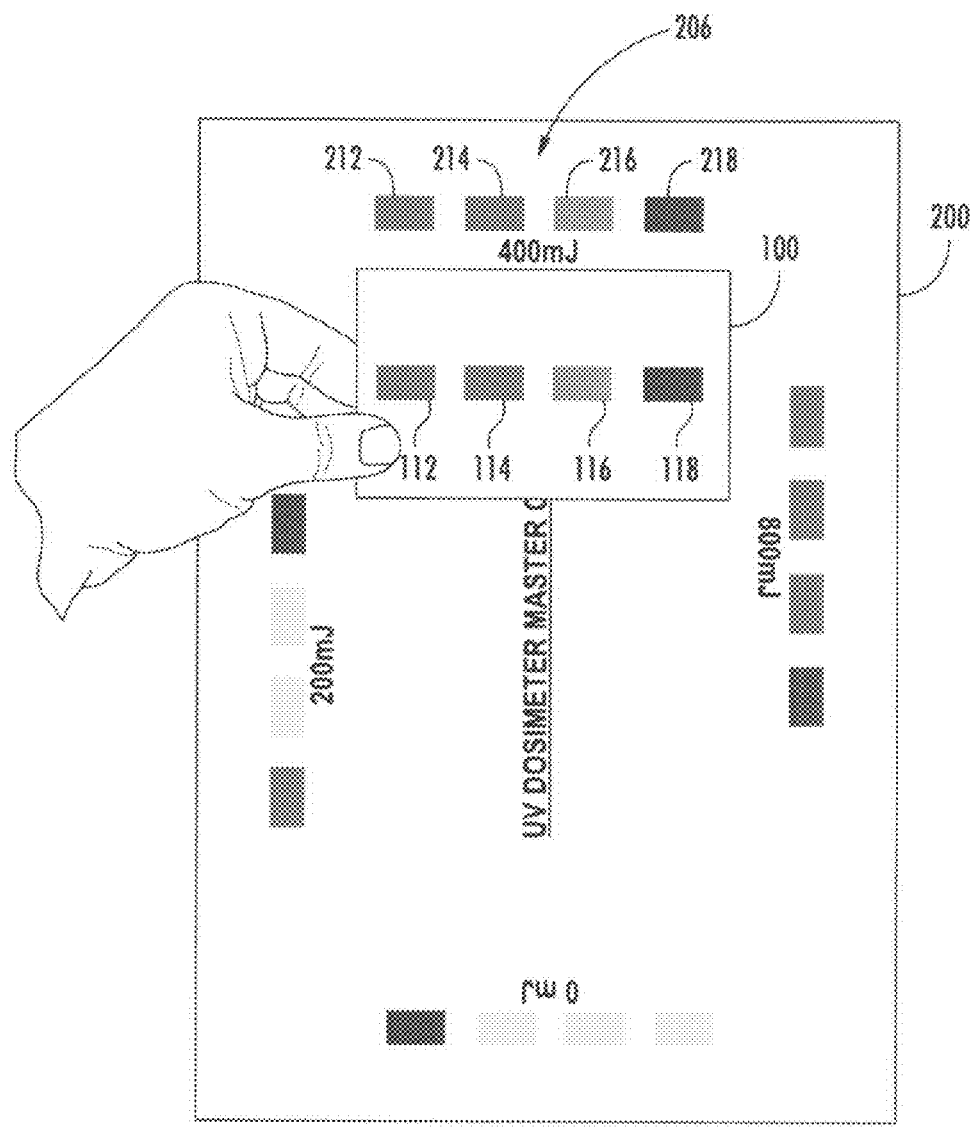
FIG. 3B is a color illustration of the illustration of FIG. 3A.

With respect to FIGS. 3A and 3B, an exemplary method of using reference card 200 in conjunction with test card 100 is illustrated. Here, the test card 100 has been exposed to UV-C radiation. To determine the dosage of the UV-C exposure, an operator may take the test card 100 and align the films thereon with a color pattern on the reference card 200 that most closely matches the color change in the films. As shown, an operator is shown aligning test card 100 with reference card 200. When properly aligned, films 112, 114, 116, and 118 should be aligned with color marks 212, 214, 216, 218 on the reference card. If the color change of each film matches the reference pattern 206, the UV-C dosage to which the test card has been exposed may be approximated. Here, the color change of the films most closely resembles the third reference pattern 206, which in this illustration refers to a UV-C dosage of at least 400 mJ/cm$^2$. In some embodiments, the test card and the reference card may be available in a kit or as a package. In this embodiment, the "kit" may include one or more reference cards with a plurality of test cards.

In some embodiments, the UV sensitive composition can be quantified according to conventional color classification systems including the Hunter L,a,b color classification system. In one alternative embodiment, the UV dosimeter and color formulations may be used in conjunction with a color meter that may be used to detect a change in the color of the composition.

The foregoing, as well as other, aspects and advantages of the invention may be further understood by reference to the following examples, which are provided for illustrative purposes only and are not intended in any way to be limiting.

EXAMPLES

In the examples below the following materials were used:

"F310" is a lacquer based copolymer of vinylidene chloride and vinyl chloride available from Dow Chemical.

"CAP" is cellulose acetate propionate available from Eastman Chemical, product number CAP-504-0.2.

"SY56" is Color Index Solvent yellow 56: N,N-diethyl-4-(phenylazo)aniline, available from Colorweigh Chemical Co.

"SB59" is Color Index Solvent Blue 59: 1,4-bis(ethylamino)-9,10-anthraquinone, available from Aldrich.

"HMTA" is hexamethylenetetramine, available from Aldrich.

TABLE 1

UV-C Dosimeter Compositions

| | | | | | Net Color Change in response to different dosages of UV-C radiation | | | | |
|---|---|---|---|---|---|---|---|---|---|
| Test Sample | F 310 (gm) | CAP (gm) | SY 56 (mg) | HMTA (mg) | SB 59 (mg) | 0 mJ/cm$^2$ | 100 mJ/cm$^2$ | 200 mJ/cm$^2$ | 400 mJ/cm$^2$ | 800 mJ/cm$^2$ |
| Sample 1 | 1 | — | 40 | — | — | Yellow | Red/orange | red | red | red |
| Sample 2 | 2 | 1 | 40 | 20 | 20 | Yellow | Yellow/orange | Red/orange | red | red |
| Sample 3 | 1 | 1 | 40 | 20 | 20 | Yellow | Yellow | Yellow/org. | Red/orange | red |
| Sample 4 | 0.5 | 1.5 | 40 | 20 | 20 | Yellow | Yellow | Yellow | Yellow/orange | orange |
| Sample 5 | 1 | 1 | 10 | 10 | 20 | Green | Green | Green | Green | Purple |

TABLE 2

| Test Sample | Rel P/S (mmoles) | Rel B/S | Net Rel (P + B)/S (mmoles) |
|---|---|---|---|
| Sample 1 | 0.16 | 0.00 | 0.16 |
| Sample 2 | 0.08 | 0.29 | 0.36 |
| Sample 3 | 0.16 | 0.57 | 0.73 |
| Sample 4 | 0.32 | 1.14 | 1.46 |
| Sample 5 | 0.08 | 0.57 | 0.65 |

P = acid sensitive dye; S = halogenated polymer; and B = acid scavenger.

From Table 1 above, it can be seen that the UV-C sensitive composition of the invention can be used to determine the UV-C dosage to which a composition, such as an oxygen scavenging (OS) composition, has been exposed. In one embodiment, the UV-C sensitive composition of the invention may be used to help determine if an OS composition has been exposed to sufficient UV-C radiation to produce the desired oxygen scavenging in the film. As a result, the UV-C sensitive composition may help improve efficiencies in the packaging of oxygen sensitive goods.

From Table 2 it can be seen that for samples 1 through 4, for each doubling of the UV dosage at which a color change occurs, the ratio of the amount of halogenated polymer to the amount acid sensitive dye and acid scavenger in the composition is roughly doubled. It has been discovered by the Applicants, that this doubling provides a dramatic color change that may be easily observable by a user.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A kit for measuring the dosage of UV-C radiation to which an article has been exposed, said kit comprising:
   a. a UV-C dosimeter comprising a substrate having a plurality of discrete UV-C sensitive compositions coated thereon and wherein said plurality of UV-C sensitive compositions includes a first UV-C sensitive composition that undergoes a color change in response a UV-C dosage of 200 mJ/cm$^2$ or greater, a second UV-C sensitive composition that undergoes a color change in response a UV-C dosage of 400 mJ/cm$^2$ or greater, and a third UV-C sensitive composition that undergoes a color change in response a UV-C dosage of 800 mJ/cm$^2$ or greater; and
   b. a UV-C dosage reference card having a first reference pattern having four discrete color marks that correspond to a UV-C dosage of 0 mJ/cm$^2$, a second reference pattern having four discrete color marks that correspond to a UV-C dosage of at least 200 mJ/cm$^2$, a third reference pattern having four discrete color marks that correspond to a UV-C dosage of at least 400 mJ/cm$^2$, and a fourth reference pattern having four discrete color marks that correspond to a UV-C dosage of at least 800 mJ/cm$^2$ or greater, wherein the UV-C dosimeter can be compared to one or more of the reference patterns of the UV-C dosage reference card to determine a relative level of UV-C radiation to which the UV-C dosimeter may have been exposed.

2. A method for determining if an oxygen scavenging composition has been exposed to a level of UV-C radiation sufficient to initiate oxygen scavenging;
   exposing a web comprising an unactivated oxygen scavenging composition to UV-C radiation in order to activate the oxygen scavenging composition;
   exposing the UV-C dosimeter of claim 1 to the UV-C radiation;
   comparing the UV-C exposed UV-C dosimeter to the UV-C dosage reference card of claim 1 to determine the proximate UV-C dosage to which the UV-C dosimeter has been exposed; and
   determining if the UV-C dosage to which the UV-C dosimeter has been exposed is sufficient to provide a desired level of oxygen scavenging in the web.

3. The method of claim 2, further comprising the step of packaging an oxygen sensitive article with the web comprising the activated oxygen scavenging composition.

4. The kit according to claim 1, wherein said plurality of UV-C sensitive compositions comprise a halogenated polymer that undergoes dehalogenation to produce an acid upon exposure to UV-C radiation, an acid scavenger, and a pH sensitive dye which changes color in response to a change in proton levels, wherein the amounts of said halogenated polymer, acid scavenger, and said pH sensitive dye in each of said plurality of UV-C sensitive compositions are selected to indicate a UV-C dosage in the range from about 200 to 800 mJ/cm$^2$.

5. The kit dosimeter according to claim 1, wherein said halogenated polymer comprises polyvinylidene chloride.

6. The kit dosimeter according to claim 1, wherein the first UV-C sensitive composition changes from a yellow to red color upon exposure of a UV-C dosage of about 200 mJ/cm$^2$ greater, and said second UV-C sensitive composition changes from a yellow to red color upon exposure of a UV-C dosage of about 400 mJ/cm$^2$ or greater.

7. The kit according to claim 1, wherein the third UV-C sensitive composition changes from a green to purple color upon exposure of a UV-C dosage of about 800 mJ/cm$^2$ greater.

8. The kit according to claim 1, wherein said UV-C dosimeter further includes a fourth UV-C sensitive composition that undergoes a color change in response a UV-C dosage of about 1,600 mJ/cm$^2$ or greater, and said reference card further comprises at least one reference pattern that corresponds to a UV-C dosage of 1,600 mJ/cm$^2$ or greater.

9. The kit according to claim 1, wherein the UV-C dosage reference card includes four peripheral side edges, and wherein each of the reference patterns is shown on a surface of the reference card adjacent to one of said four peripheral side edges.

10. A kit for measuring the dosage of UV-C radiation to which an article has been exposed, said kit comprising:
  a. a UV-C dosimeter comprising a substrate having a plurality of spaced apart UV-C sensitive compositions coated thereon and wherein said plurality of UV-C sensitive compositions includes a first UV-C sensitive composition that undergoes a color change in response a UV-C dosage of 200 mJ/cm$^2$ or greater, a second UV-C sensitive composition that undergoes a color change in response a UV-C dosage of 400 mJ/cm$^2$ or greater, and a third UV-C sensitive composition that undergoes a color change in response a UV-C dosage of 800 mJ/cm$^2$ or greater; and
  b. a UV-C dosage reference card having a first reference pattern having four discrete color marks that correspond to a UV-C dosage of 0 mJ/cm$^2$, a second reference pattern having four discrete color marks that correspond to a UV-C dosage of at least 200 mJ/cm$^2$, a third reference pattern having four discrete color marks that correspond to a UV-C dosage of at least 400 mJ/cm$^2$, and a fourth reference pattern having four discrete color marks that correspond to a UV-C dosage of at least 800 mJ/cm$^2$ or greater, wherein following an exposure to UV-C radiation, the UV-C dosimeter can be compared to one or more of the reference patterns of the UV-C dosage reference card to determine a relative level of UV-C radiation to which the UV-C dosimeter may have been exposed.

11. The kit according to claim 10, wherein said plurality of UV-C sensitive compositions comprise a halogenated polymer that undergoes dehalogenation to produce an acid upon exposure to UV radiation, an acid scavenger, and a pH sensitive dye which changes color in response to a change in proton levels, wherein the amounts of said halogenated polymer, acid scavenger, and said pH sensitive dye in each of said first, second, and third UV-C sensitive compositions are selected to indicate a UV-C dosage of 200 mJ/cm$^2$, 400 mJ/cm$^2$, and 800 mJ/cm$^2$, respectively.

12. The kit to claim 11, wherein said halogenated polymer, said acid scavenger, and said pH sensitive dye are soluble in a lacquer based solution.

13. The kit to claim 11, wherein said halogenated polymer comprises polyvinylidene chloride.

14. The kit according to claim 11, wherein the UV-C sensitive composition further comprises a diluent selected from the group consisting of cellulose acetate propionate, starch, hydroxyethyl cellulose, methyl cellulose, carboxymethyl cellulose, gelatin, casein, gum arabic, styrene-maleic anhydride copolymers, ethylene-acrylate copolymers, styrene-butadiene copolymers, acrylonitrilebutadiene copolymers, poly (ethylenevinyl acetate), and combinations thereof.

15. The kit to claim 11, wherein the first UV-C sensitive composition changes from a yellow to red color upon exposure of a UV-C dosage of 200 mJ/cm$^2$ or greater, and said second UV-C sensitive composition changes from a yellow to red color upon exposure of a UV-C dosage of 400 mJ/cm$^2$ or greater.

16. The kit to claim 11, wherein the third UV-C sensitive composition changes from a green to purple color upon exposure of a UV-C dosage of 800 mJ/cm$^2$ or greater.

* * * * *